United States Patent
Nam et al.

(10) Patent No.: US 11,258,135 B2
(45) Date of Patent: Feb. 22, 2022

(54) BATTERY SEPARATOR INCLUDING FUNCTIONAL BINDER AND ELECTROCHEMICAL DEVICE COMPRISING THE SAME

(71) Applicant: LG CHEM, LTD., Seoul (KR)

(72) Inventors: Kwan Woo Nam, Daejeon (KR); Su Jin Yoon, Daejeon (KR); Hye Jin Kwon, Daejeon (KR); Chan Jong Kim, Daejeon (KR); Je An Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 16/463,441

(22) PCT Filed: Jan. 5, 2018

(86) PCT No.: PCT/KR2018/000309
§ 371 (c)(1),
(2) Date: May 23, 2019

(87) PCT Pub. No.: WO2018/128484
PCT Pub. Date: Jul. 12, 2018

(65) Prior Publication Data
US 2019/0355953 A1   Nov. 21, 2019

(30) Foreign Application Priority Data

Jan. 6, 2017   (KR) .................. 10-2017-0002219
Mar. 10, 2017  (KR) .................. 10-2017-0030566
Jan. 5, 2018   (KR) .................. 10-2018-0001926

(51) Int. Cl.
*H01M 2/16*     (2006.01)
*H01M 50/449*   (2021.01)
(Continued)

(52) U.S. Cl.
CPC ....... *H01M 50/449* (2021.01); *H01M 50/403* (2021.01); *H01M 50/411* (2021.01); *H01M 50/431* (2021.01)

(58) Field of Classification Search
CPC .. H01M 2/145; H01M 2/1686; H01M 2/1646; H01M 2/1653
See application file for complete search history.

(56) References Cited

U.S. PATENT DOCUMENTS 4,501,793 A * 2/1985 Sarada ................. C08J 9/42
                                              428/315.5
7,709,152 B2  5/2010 Kim et al.
(Continued)

FOREIGN PATENT DOCUMENTS

CN   101401232 A   4/2009
CN   101542777 A   9/2009
(Continued)

OTHER PUBLICATIONS

Extended European Search Report for European Application No. 18736258.7, dated Jul. 19, 2019.
(Continued)

*Primary Examiner* — Jane J Rhee
(74) *Attorney, Agent, or Firm* — Birch, Stewart, Kolasch & Birch, LLP

(57) ABSTRACT

A functional binder and a separator including the functional binder, in which the separator includes a porous polyolefin substrate and an organic-inorganic hybrid porous coating layer formed on at least one surface of the substrate and configured to include a mixture of inorganic particles and a binder compound, thus increasing binder-inorganic material adhesion and substrate-binder adhesion while preventing internal shorting from occurring by performing self-healing of damage to the separator, enhancing the adhesion of the separator to a cathode and an anode, and withstanding the (Continued)

dissolution of a transition metal of a cathode material. The binder contains 10 wt % or more of a hydroxyl group per molecule thereof.

9 Claims, 11 Drawing Sheets

(51) Int. Cl.
*H01M 50/403* (2021.01)
*H01M 50/411* (2021.01)
*H01M 50/431* (2021.01)

(56) References Cited

U.S. PATENT DOCUMENTS

| | | |
|---|---|---|
| 9,847,519 B2 | 12/2017 | Pekala et al. |
| 10,056,589 B2 | 8/2018 | Ryu et al. |
| 2009/0111025 A1 | 4/2009 | Lee et al. |
| 2009/0111026 A1 | 4/2009 | Kim et al. |
| 2009/0305141 A1* | 12/2009 | Lee .................. H01M 4/02 429/232 |
| 2011/0091774 A1 | 4/2011 | Wakizaka et al. |
| 2011/0143183 A1 | 6/2011 | Matsumoto et al. |
| 2012/0015254 A1 | 1/2012 | Lee et al. |
| 2013/0236574 A1 | 9/2013 | Tewari et al. |
| 2014/0107275 A1 | 4/2014 | Uemura et al. |
| 2014/0178740 A1 | 6/2014 | Ryu et al. |
| 2016/0028067 A1 | 1/2016 | Pekala et al. |
| 2016/0141574 A1 | 5/2016 | Ryu et al. |
| 2016/0276642 A1 | 9/2016 | Mizuno et al. |
| 2017/0117521 A1 | 4/2017 | Sasaki |
| 2018/0248164 A1 | 8/2018 | Pekala et al. |

FOREIGN PATENT DOCUMENTS

| | | |
|---|---|---|
| CN | 101981727 A | 2/2011 |
| CN | 102412377 A | 4/2012 |
| CN | 102668172 A | 9/2012 |
| CN | 103643171 A | 6/2014 |
| CN | 104157819 A | 11/2014 |
| CN | 104205417 A | 12/2014 |
| CN | 105229066 A | 1/2016 |
| JP | 11-288741 A | 10/1999 |
| JP | 2004-273394 A | 9/2004 |
| JP | 2008-123996 A | 5/2008 |
| JP | 2008-524824 A | 7/2008 |
| JP | 2010-517811 A1 | 5/2010 |
| JP | 2015-69957 A | 4/2015 |
| JP | JP WO2015/198530 A1 | 12/2015 |
| JP | 2016-4758 A | 1/2016 |
| JP | 2016-521433 A | 7/2016 |
| JP | 2016-139489 A | 8/2016 |
| KR | 10-0727248-81 | 6/2007 |
| KR | 10-0775310 B1 | 11/2007 |
| KR | 10-2011-0005793 A | 1/2011 |
| KR | 10-2011-0031998 A | 3/2011 |
| KR | 10-2013-0096638 A | 8/2013 |
| KR | 10-1330675 B1 | 11/2013 |
| KR | 10-2014-0044835 A | 4/2014 |
| KR | 10-2014-0144192 A | 12/2014 |
| KR | 10-2015-0050511 A | 5/2015 |
| KR | 10-2015-0069781 A | 6/2015 |
| KR | 10-1535198 B1 | 7/2015 |
| KR | 10-2016-0041492 A | 4/2016 |
| WO | JP WO2010/104127 A1 | 9/2010 |
| WO | WO 2013/014681 A1 | 1/2013 |
| WO | JP WO2014/175050 A1 | 10/2014 |
| WO | WO 2016/034020 A1 | 3/2016 |

OTHER PUBLICATIONS

Courtel et al., "Water-soluble binders for MCMB carbon anodes for lithium-ion batteries" Journal of Power Sources, 2011, vol. 196, No. 4, pp. 2128-2134, Total 9 pages.
Ejima et al., "One-Step Assembly of Coordination Complexes for Versatile Film and Particle Engineering" Science 2013, vol. 341, pp. 154-157, Total 5 pages.
International Search Report (PCT/ISA/210) issued in PCT/KR2018/000309, dated May 11, 2018.
Jeong et al., "Millipede-inspired structural design principle for high performance polysaccharide binders in silicon anodes", Energy & Environmental Science, 2015, vol. 8, pp. 1224-1230, Total 2 pages.
Murase et al., "Crop-derived polysaccharides as binders for high-capacity silicon/graphite-based electrodes in lithium-ion batteries", NCBI, 2016, Total 1 page.
Pan et al., "Tannic-Acid-Coated Polypropylene Membrane as a Separator for Lithium-Ion Batteries", ACS Applied Materials & Interfaces, 2015, vol. 7, pp. 16003-16010.
Tee et al., "Pressure and flexion-sensitive electronic skin with repeatable ambient self-healing capability Supplementary Information", Nature Nanotechnology, 2012, vol. 192, pp. 1-25.
Wang et al., "Nature-Inspired Electrochemical Energy-Storage Materials and Devices", Advanced Energy Materials, 2016, 1601709, pp. 1-18.
Wang et al., "Pyrogallic acid coated polypropylene membranes as separators for lithium-ion batteries", Journal of Materials Chemistry A, 2015, vol. 3, pp. 20535-20540.
Wang et al., "Self-healing chemistry enables the stable operation of silicon microparticle anodes for high-energy lithium-ion batteries", Nature Chemistry, 2013, vol. 5, pp. 1042-1048.
Wang et al., "Xanthan Gum as a Potential Binder for Graphite Anode in Lithium-Ion Batteries", Int. J. Electrochem. Sci., 2017, vol. 12, pp. 7457-7468.
White et al., "Autonomic healing of polymer composites", Nature 2001, vol. 409, pp. 794-797, Total 5 pages.
Yoon et al., "Dependency of Electrochemical Performances of Silicon Lithium-Ion Batteries on Glycosidic Linkages of Polysaccharide Binders", ACS Applied Materials & Interfaces, 2016, vol. 8, No. 6, pp. 4042-4047, Total 2 pages.
Zhang et al., "Hydrophilic modification of PVDF porous membrane via a simple dip-coating method in plant tannin solution", Royal Society of Chemistry, 2016, vol. 6, pp. 71287-71294.

* cited by examiner

SBR binder (anode)    Tannic acid (separator)    PVDF binder (cathode)

(M=Mn, Fe, Ni, Co)

BATTERY SEPARATOR INCLUDING FUNCTIONAL BINDER AND ELECTROCHEMICAL DEVICE COMPRISING THE SAME

TECHNICAL FIELD

The present invention relates to a separator including a functional binder, and more particularly to a separator configured such that one surface of a polyolefin substrate is coated with inorganic particles and a functional binder having improved properties, and to an electrochemical device including the separator.

BACKGROUND ART

Thorough research is ongoing with the goal of increasing the stability of a battery separator, especially a separator for a lithium ion secondary battery. A safety-reinforced separator (SRS), which is currently mass-produced, is configured such that the surface of a polyolefin-based substrate is coated with inorganic particles and a binder. A volume in which a liquid electrolyte is placed is increased by virtue of the porous structure due to the inorganic particles and the binder to thus increase lithium ion conductivity and an electrolyte impregnation ratio, whereby both the performance and the stability of an electrochemical device using the separator may be improved. In this regard, Patent Document 1 discloses an organic-inorganic hybrid porous separator and an electrochemical device using the same.

In order to maintain the stability of the SRS, the adhesion characteristics of a binder-inorganic material and a substrate-binder for preventing the inorganic material from being stripped from the surface of a polyolefin substrate are regarded as very important. A binder that is currently available is of a PVDF type and has low adhesion characteristics. Hence, there is a need to develop a novel binder in order to improve stability.

A PVDF-based binder may exhibit high adhesion to a cathode but low adhesion to an anode using an SBR (Styrene-Butadiene Rubber)-based binder. Furthermore, a PVDF-based binder is hydrophobic and thus exhibits poor wetting properties of a separator in an electrolyte, undesirably deteriorating the power output of a battery.

A currently available SRS is problematic in that it cannot withstand the dissolution of a transition metal of a cathode material under conditions of high temperature and high voltage, which may frequently occur during the driving of an electric vehicle. A conventional binder is incapable of adsorbing the dissolved transition metal, undesirably shortening the life cycle of the battery.

Since damage to the separator due to heat and pressure is irreversible, problems of low power output and low safety of the battery attributed to the separator once damaged cannot be overcome.

Many attempts have been made to introduce a compound containing a hydrophilic group in order to improve the properties of a separator. Non-Patent Document 1, which is aimed at improving the wetting properties of a commercially available PP (Polypropylene) separator of a lithium ion battery, discloses a surface-coating process for immersing a PP substrate in tannic acid, which is a natural vegetable polyphenyl. However, the surface of PP is hydrophobic, and thus tannic acid, having a large number of hydroxyl groups, is not uniformly distributed on the surface of PP, and the coating layer does not exhibit sufficient durability during the manufacture of an electrochemical device using the same and upon the charge/discharge thereof.

Non-Patent Document 2, which is aimed at improving the wetting properties of a PP substrate serving as a separator of a lithium ion battery, discloses a coating process using pyrogallic acid. Like Non-Patent Document 1, Non-Patent Document 2 enables realization of a uniform coating layer in a short time because pyrogallic acid has low physicochemical affinity to PP, which is hydrophobic, but the coating layer does not have sufficient durability and uniformity during the manufacture of an electrochemical device using the same and during charge/discharge thereof.

Non-Patent Documents 3 to 6 disclose a binder having self-healing performance, such as a capsule-shaped binder for improving the properties of an anode containing silicon. Such a binder is developed in order to solve the problem that occurs when using a silicon anode having high capacity, that is, low bondability of a conventional PVDF to silicon, but is difficult to directly apply to a currently useful SRS binder.

With the goal of improving the wetting properties of a separator, the technique for disposing a binder film on the outermost layer of an SRS is disclosed in Patent Document 2. Although hydrophilicity is improved due to the film of the outermost layer, it is difficult to access the pores formed by the inorganic particles and the binder, making it impossible to improve the performance and stability of an electrochemical device.

Patent Document 3 discloses a battery separator and a non-aqueous electrolyte battery using the same. In the battery separator including a resin porous film composed mainly of a thermoplastic resin and a multilayered porous film comprising a heat-resistant porous layer composed mainly of heat-resistant particles, the heat-resistant porous layer has a thickness of 1 to 15 μm, and the peel strength of the resin porous film and the heat-resistant porous layer at 180° is 0.6 N/cm or more.

Both the present invention and Patent Document 3 are related to a separator for a lithium secondary battery having improved thermal safety. However, the binder of the present invention may exhibit not only thermal stability but also an enhancement in adhesion, adsorption of a transition metal of a cathode material, self-healing, and the like, which are never noted in Patent Document 3. Hence, there is a significant difference in the molecular structure of a binder therebetween. Specifically, the binder of the present invention contains large numbers of —O and hydroxyl (OH) functional groups in the molecules thereof, whereas the binder of Patent Document 3 includes an N-vinylacetamide polymer or a water-soluble cellulose derivative, along with a crosslinked acrylic resin.

Meanwhile, Patent Document 3 uses xanthan gum, which is used as the binder of the present invention, as a thickener. The binder and the thickener are remarkably different in terms of the amounts thereof. In Patent Document 3, the binder is used in an amount of 1.1 parts by mass or more based on 100 parts by mass of heat-resistant particles, whereas the thickener is used in an amount of 0.1 parts by mass or more based on 100 parts by mass of heat-resistant particles. Here, the binder and the thickener differ by about 10 times in terms of the amounts thereof, and thus it can be found that the binder and the thickener are incompatible with each other. Although the present invention and Patent Document 3 are similar in that they both disclose the use of xanthan gum, the specific end uses thereof are different, and Patent Document 3 does not mention the technical features of the binder that is used in the present invention.

Non-Patent Document 7, which is a review paper on natural materials used in electrochemical energy storage devices, discloses the use of natural materials such as amylopectin, xanthan gum and the like as the binder. However, the binder of Non-Patent Document 7 is used for a cathode or an anode and is thus different in terms of the end use and functionality from those of the binder of the separator used in the present invention. In particular, the binder for a separator of the present invention has properties quite different from those of the material used for a cathode or an anode because the separator includes an inorganic material, and the detailed technical field therebetween is different.

In order to maintain the thermal stability of the SRS including inorganic particles as described above, techniques for increasing the binder-inorganic material adhesion and the substrate-binder adhesion while preventing internal shorting from occurring by performing self-healing of damage to the separator, enhancing the adhesion of the separator to a cathode and an anode, and withstanding the dissolution of a transition metal of a cathode material have not yet been introduced to date.

Korean Patent No. 10-0775310
Korean Patent No. 10-1535198
Korean Patent Application Publication No. 2011-0031998
Lei Pan et al., "Tannic-Acid-Coated Polypropylene Membrane as a Separator for Lithium ion Batteries", ACS Appl. Mater. Interfaces, 7(29), 16003-16010(2015).
Haibin Wang et al., "Pyrogallic acid coated polypropylene membranes as separators for lithium-ion batteries", J. Mater. Chem. A, 3, 20535-20540 (2015).
S. R. White et al., "Autonomic healing of polymer composites", Nature, 409, 794-797 (2001).
Benjamin C-K Tee et al., "Pressure and flexionsensitive electronic skin with repeatable ambient self-healing capability", Nature nanotechnology, 7, 825 (2012).
Chao Want et al., "Self-healing chemistry enables the stable operation of silicon microparticle anodes for high-energy lithium-ion batteries", Nature Chemistry, 5, 1042-1048 (2013).
You Kyeong Jeong et al., "Millipede-inspired Structural Design Principles for High Performance Polysaccharide Binders in Silicon Anodes", Energy & Environmental Science, 8 1224 (2015).
Hua Wang et al., "Nature-Inspired Electrochemical Energy-Storage Materials and Devices", Adv. Energy Materials 1601709 (2016).

DISCLOSURE

Technical Problem

Accordingly, the present invention is intended to provide a functional binder and a battery separator including the functional binder, in which the separator includes a porous polyolefin substrate and an organic-inorganic hybrid porous coating layer formed on at least one surface of the substrate and configured to include inorganic particles and a binder compound, thus increasing binder-inorganic material adhesion and substrate-binder adhesion while preventing internal shorting from occurring by performing self-healing of damage to the separator, enhancing the adhesion of the separator to a cathode and an anode, and withstanding the dissolution of a transition metal of a cathode material.

Technical Solution

Therefore, a first aspect of the present invention provides a battery separator, comprising (a) a polyolefin-based substrate and (b) an active layer comprising a mixture of inorganic particles and a binder, in which the inorganic particles in the active layer are connected and fixed to each other by the binder, and a porous structure is formed due to the interstitial volume between the inorganic particles, wherein the active layer is present as a coating on at least one region selected from the group consisting of (a) a surface of the substrate, and (b) a portion of pores in the substrate, and the binder contains 10 wt % or more of a hydroxyl group per molecule thereof.

Specifically, the binder may include at least one selected from among tannic acid, pyrogallic acid, amylose, amylopectin, and xanthan gum, or the binder may be a mixture comprising 1) at least one selected from among tannic acid, pyrogallic acid, amylose, amylopectin, and xanthan gum and 2) at least one selected from among polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, an acrylonitrilestyrene-butadiene copolymer, and polyimide.

The inorganic particles may be at least one selected from the group consisting of inorganic particles having a dielectric constant of 5 or more, inorganic particles having piezoelectricity, and inorganic particles having lithium ion transfer capacity.

The inorganic particles having a dielectric constant of 5 or more may be $SrTiO_3$, $SnO_2$, $CeO_2$, $MgO$, $NiO$, $CaO$, $ZnO$, $ZrO_2$, $Y_2O_3$, $Al_2O_3$, $TiO_2$ or SiC; the inorganic particles having piezoelectricity may be $BaTiO_3$, $Pb(Zr,Ti)O_3$ (PZT), $Pb_{1-x}La_xZr_{1-y}Ti_yO_3$ (PLZT), $Pb(Mg_3Nb_{2/3})O_3$-$PbTiO_3$ (PMN-PT) or hafnia ($HfO_2$); and the inorganic particles having lithium ion transfer capacity may be lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ ($Li_xSi_yS_z$, $0<x<3$, $0<y<2$, $0<z<4$)-based glass or $P_2S_5$ ($Li_xP_yS_z$, $0<x<3$, $0<y<3$, $0<z<7$)-based glass.

Specifically, the inorganic particles may include at least one selected from among $Al_2O_3$, AlOOH, and $Mg(OH)_2$.

The polyolefin-based substrate comprise at least one selected from the group consisting of high-density polyethylene, low-density polyethylene, linear low-density polyethylene, ultrahigh-molecular-weight polyethylene, and polypropylene.

A second aspect of the present invention provides a method of manufacturing the battery separator, comprising the steps of 1) preparing a binder solution by dissolving a binder in a solvent, 2) adding and mixing the binder solution obtained in the step 1) with inorganic particles, and 3) coating at least one region selected from the group consisting of (a) a surface of a polyolefin-based substrate and (b) a portion of pores in the substrate with the solution obtained in the step 2) and performing drying, the hinder containing 10 wt % or more of a hydroxyl group per molecule thereof.

The solvent may include water and acetone mixed at a weight ratio of 100:0 to 0:100, preferably 95:5 to 0:100, more preferably 75:25 to 0:100, much more preferably 60:40 to 0:100, even more preferably 50:50 to 0:100, and most preferably 40:60 to 0:100. In an embodiment of the present invention, the optimal ratio thereof is 75:25.

A third aspect of the present invention provides an electrochemical device comprising the battery separator of the present invention. Here, the electrochemical device may be a lithium secondary battery.

BEST MODE

The present invention is directed to a battery separator including a functional binder, which may simultaneously exhibit superior thermal safety, electrochemical safety, lithium ion conductivity, electrolyte impregnation ratio, self-healing performance, and the like, compared to a polyolefin-based separator for use in a conventional battery separator, and also in which the use of the functional binder containing a large amount of a hydrophilic functional group is capable of enhancing the adhesion of a battery-separator and is capable of adsorbing a transition metal dissolved at a cathode, and to a method of manufacturing the same.

According to the present invention, the battery separator includes (a) a polyolefin-based substrate and (b) an active layer configured such that at least one region selected from the group consisting of a surface of the substrate and a portion of pores in the substrate is coated with a mixture of inorganic particles and a binder, in which the inorganic particles in the active layer are connected and fixed to each other by the binder, and a porous structure is formed due to the interstitial volume between the inorganic particles, the binder containing 10 wt % or more of a hydroxyl group per molecule thereof. Here, the amount of hydroxyl group per molecule thereof preferably falls in the range of 12 wt % to 50 wt %, more preferably 15 wt % to 45 wt %, much more preferably 18 wt % to 40 wt %, and even more preferably 18 wt % to 38 wt %. If the amount of the hydroxyl group is less than 10 wt %, the amount of the hydrogen-bonding functional group of the binder is not sufficient, and thus the functionality desired in the present invention is not sufficiently exhibited. On the other hand, if the amount of the hydroxyl group exceeds 50 wt %, there may arise a problem in that the movement of the electrolyte is restricted due to strong hydrogen bonding.

Specifically, the binder may include at least one selected from among tannic acid, pyrogallic acid, amylose, amylopectin, and xanthan gum, or the binder may be a mixture of 1) a mixture comprising at least one selected from among tannic acid, pyrogallic acid, amylose, amylopectin, and xanthan gum and 2) a mixture comprising at least one selected from among polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, an acrylonitrile-styrene-butadiene copolymer, and polyimide.

Figure 1:
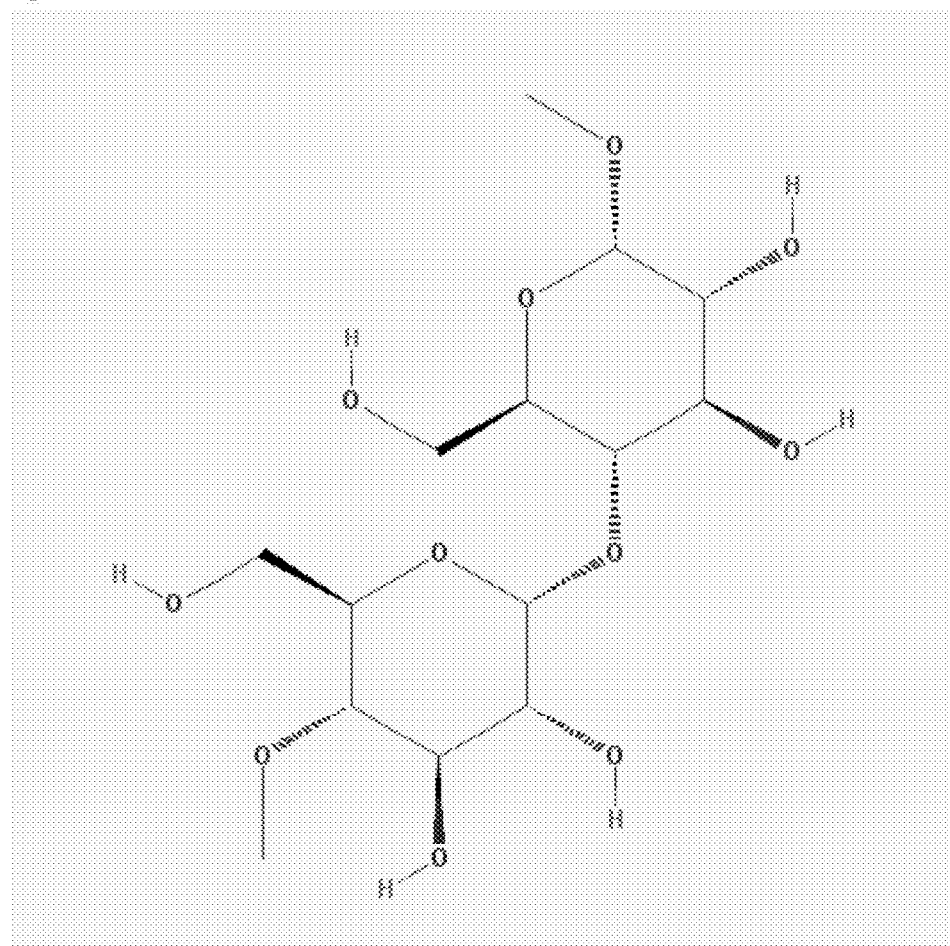
FIG. 1 shows the unit structure of amylose, which is an example of a binder according to the present invention.
Figure 2:
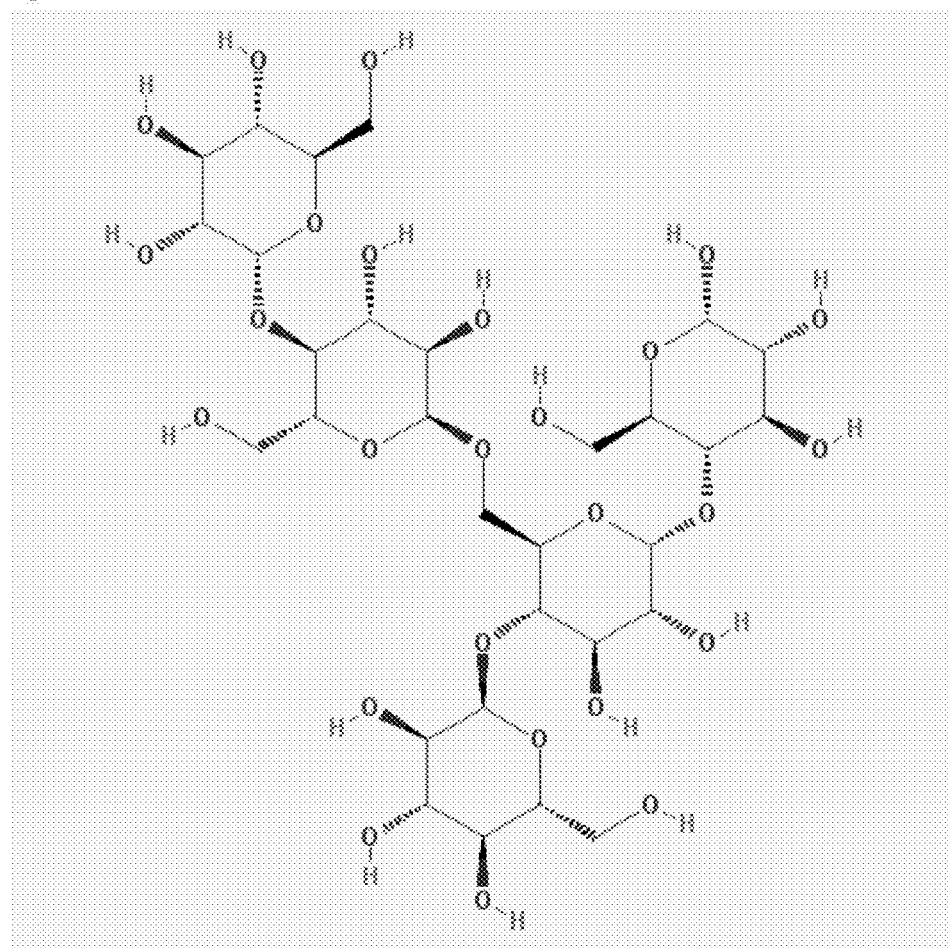
FIG. 2 shows the unit structure of amylopectin, which is an example of a binder according to the present invention.
Figure 3:
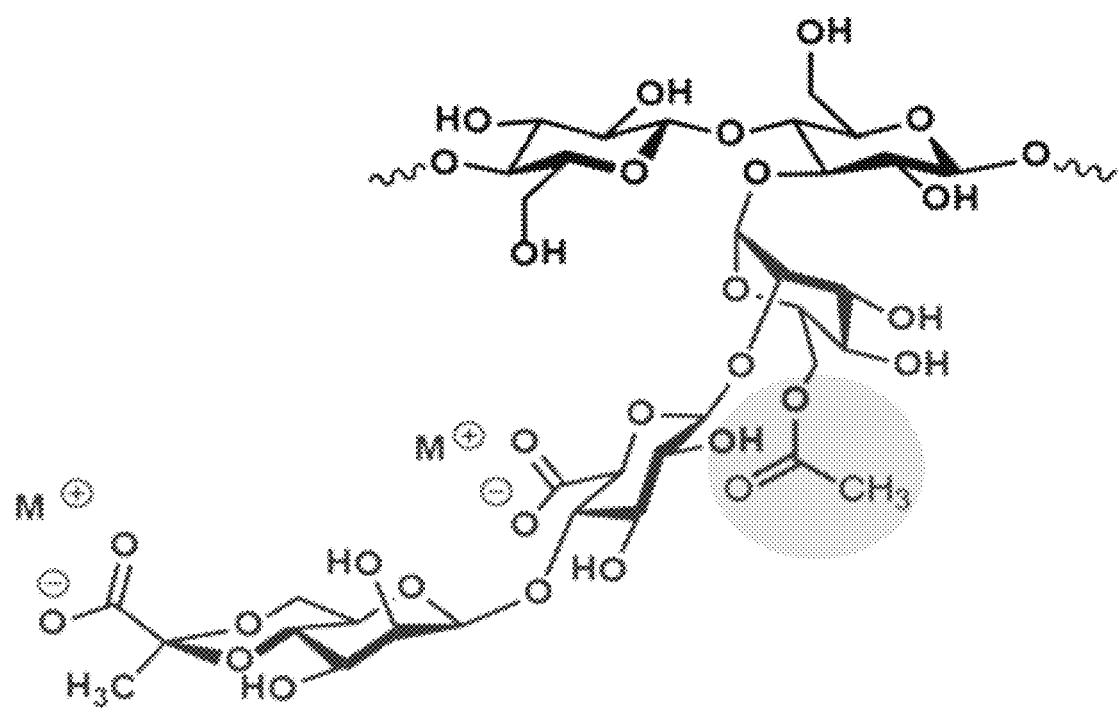
FIG. 3 shows the unit structure of xanthan gum, which is an example of a binder according to the present invention.
Figure 4:
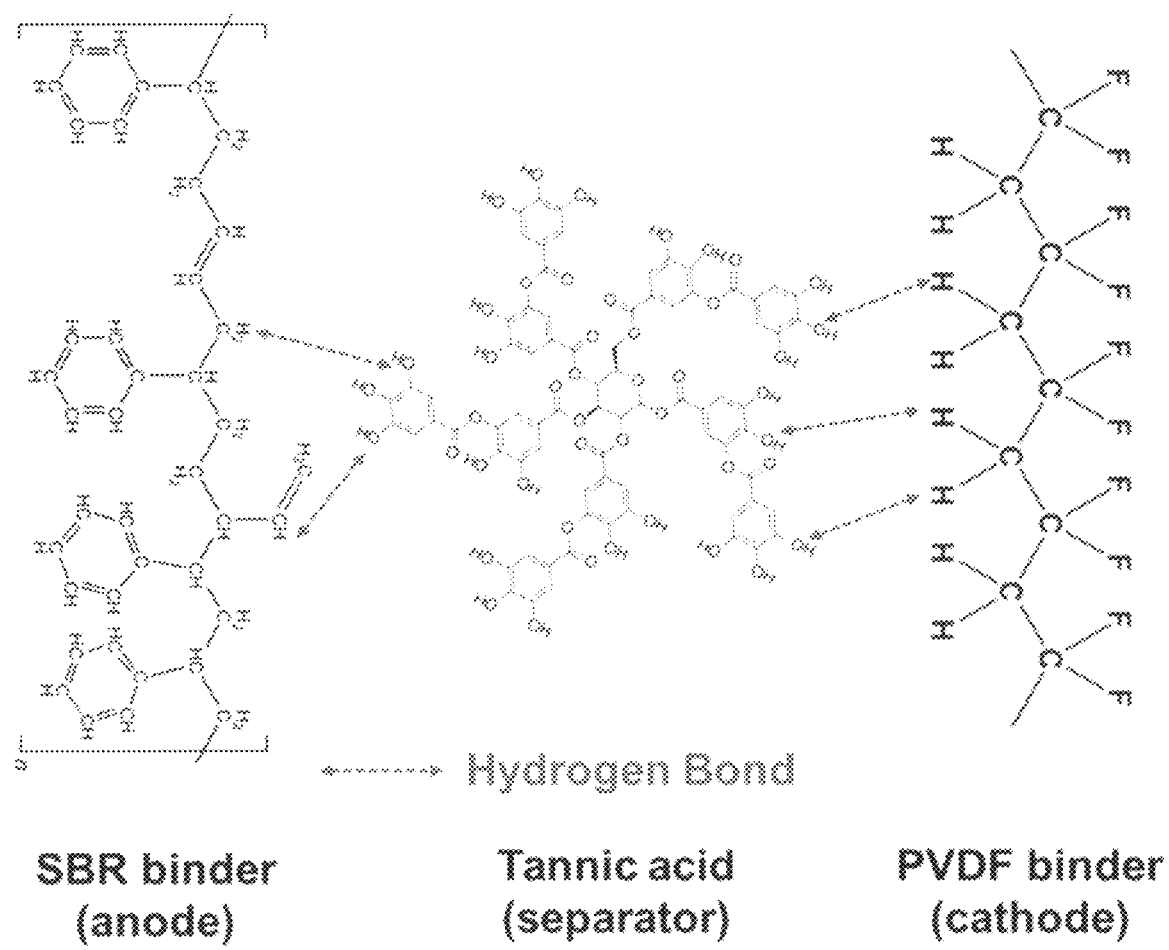
FIG. 4 shows the hydrogen bonding between an electrode and a separator when using tannic acid as a binder according to an embodiment of the present invention.

The binder containing 10 wt % or more of a hydroxyl group per molecule thereof is exemplified by amylose (FIG. 1), amylopectin (FIG. 2), xanthan gum (FIG. 3), and tannic acid (FIG. 4). The amounts of OH per molecule of amylose, amylopectin and xanthan gum are 18 wt %, 25 wt % and 32 wt %, respectively. In all of the cases, the amount of hydroxyl group (OH) is 10 wt % or more, from which strong hydrogen bonding can be confirmed to be formed. Here, the hydroxyl group is considered to be an OH group, and excludes a carboxyl group (COOH).

According to the present invention, the binder is capable of strongly binding to both a cathode and an anode by means of the hydrophilic functional group. The molecular bonding relationship therefor is schematically illustrated in FIG. 4.

Figure 5:
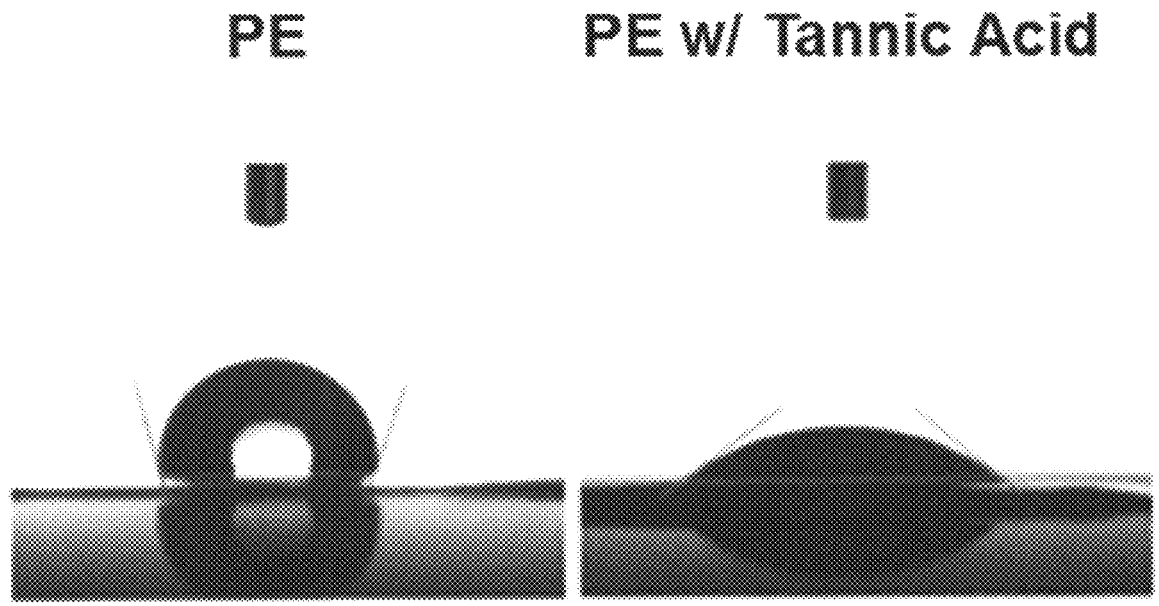
FIG. 5 shows the improvement in wetting properties upon the use of tannic acid according to an embodiment of the present invention.

In the case where a hydrophilic binder is used, a conventional PE substrate is hydrophobic and thus exhibits low affinity to water, but the use of tannic acid, which is an example of the binder according to the present invention, results in conversion into hydrophilicity (FIG. 5).

Figure 6:
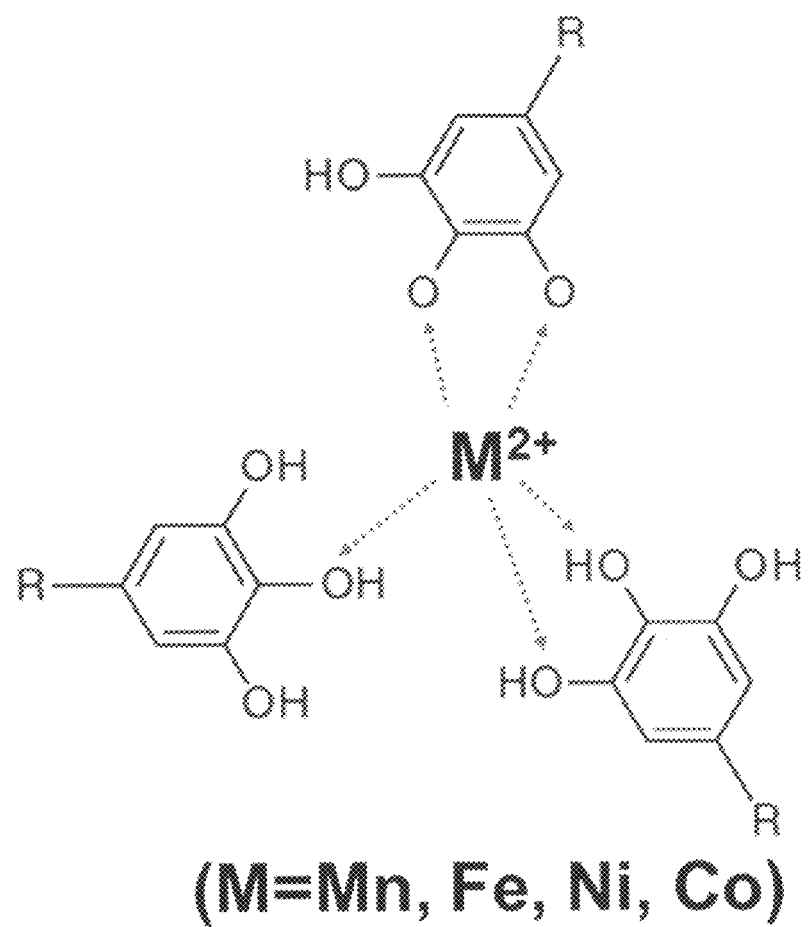
FIG. 6 shows the adhesion mechanism for a transition metal of a cathode material through hydrogen bonding.

Moreover, the adsorption mechanism for the transition metal of a cathode material by means of the binder containing a hydrophilic group according to the present invention is illustrated in FIG. 6.

Figure 8:
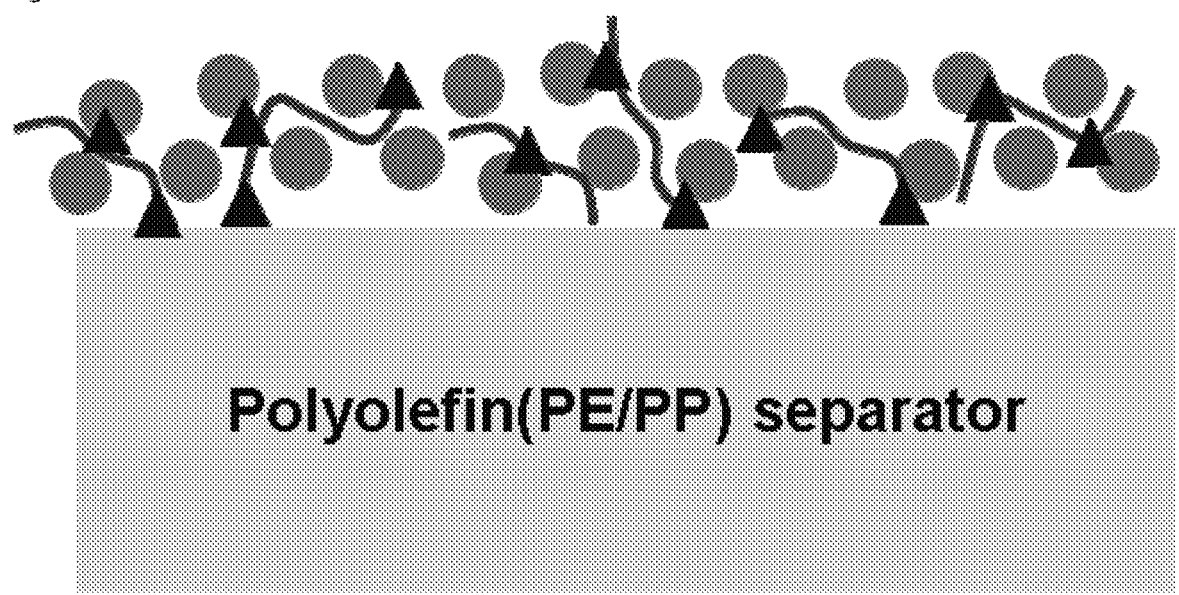
FIG. 8 conceptually shows the structure of an SRS using the binder of the present invention.

FIG. 8 conceptually illustrates the separator according to the present invention. A typical binder is configured such that no great attraction acts between the ends or the middle portions of the binder, but the binder according to the present invention is able to retain strong hydrogen bonding due to the —O/—OH group. In FIG. 8, the triangular shape denotes a hydroxyl group or a hydrophilic group. The circle denotes inorganic particles.

Figure 9:
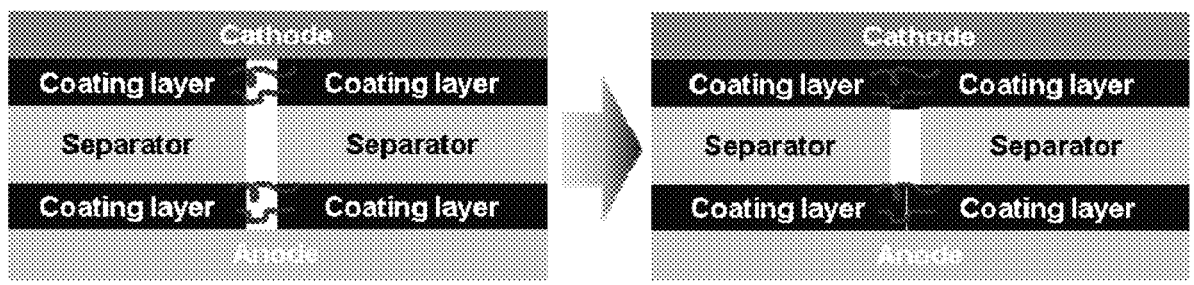
FIG. 9 conceptually shows the self-healing performance upon the use of the binder of the present invention.

In the case where the separator is partially damaged and thus internal shorting occurs, as shown in the left of FIG. 9, the damaged portion may be self-healed by virtue of the inner hydrogen bonding of the binder. Thereby, internal shorting may be prevented from occurring.

Hereinafter, a detailed description will be given of the present invention. Prior thereto, it must be understood that the terms or words used in the description and the claims of the present invention are not to be construed limitedly as having typical or dictionary meanings, but should be interpreted as having the meanings and concepts of the invention in keeping with the scope of the invention based on the principle that the inventors can appropriately define the terms in order to describe the invention in the best way. Therefore, the examples described in the present specification are merely preferred embodiments of the present invention, and do not represent all of the technical ideas of the present invention, and thus it is to be understood that a variety of equivalents and modifications able to substitute therefor may be provided at the point of time at which the present invention is filed.

EXAMPLE 1

Manufacture of Lithium Ion Battery Separator Including Functional Binder

A mixture of polyvinylidene fluoride-co-chlorotrifluoroethylene (PVdF-CTFE) and tannic acid (at a weight ratio of 50:50) was added in an amount of about 5 wt % to acetone, and dissolved at a temperature of 50° C. for about 12 hr, thus preparing a polymer solution. The polymer solution was added with a $BaTiO_3$ powder such that the ratio of $BaTiO_3$/(PVdF-CTFE and tannic acid) was 90/10 (wt % ratio), after which the $BaTiO_3$ powder was crushed and pulverized using a ball-milling process for 12 hr or more, thus preparing a slurry. Although the particle size of $BaTiO_3$ of the slurry thus prepared may be controlled depending on the size (particle size) of beads used for the ball-milling process and the processing time of the ball-milling process, in Example 1 of the present invention, the powder was pulverized to about 400 nm to give a slurry. The slurry thus obtained was applied on a polyethylene separator (having a porosity of 45%) having a thickness of about 18 μm using a dip-coating process, and the coating thickness was adjusted to about 3 μm. Based on the results of measurement using a porosimeter, the pore size and porosity in the active layer applied on the polyethylene separator were 0.5 μm and 58%, respectively.

Comparison of Example 2 and Comparative Example 1

Figure 7:
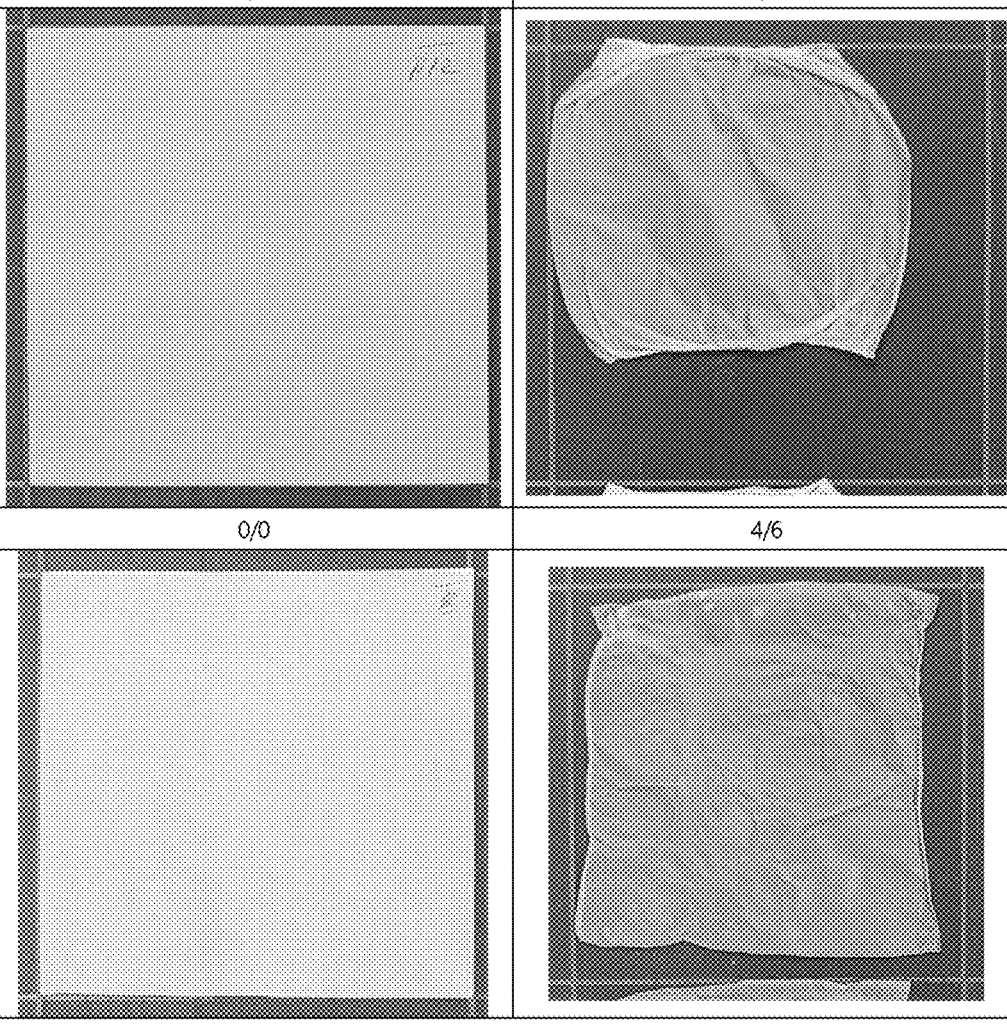
FIG. 7 shows the results of comparison for thermal shrinkage when using tannic acid as the binder according to an embodiment of the present invention.

Comparison of thermal shrinkage properties of lithium ion battery separator including functional binder (FIG. 7)

The battery separator of Example 2 was manufactured in the same manner as in Example 1, with the exception that the weight ratio of the binder to the inorganic material in the coating composition was changed to 15:85. The battery separator of Comparative Example 1 was manufactured under the same conditions as in Example 2, with the exception that tannic acid was not used in the binder. The coating layers in Comparative Example 1 and Example 2 were formed to thicknesses of 5 μm and 3 μm, respectively. Based on the results of comparison of thermal shrinkage at the same temperature of 150° C. in Example 2 and Comparative Example 1, Example 2 according to the present invention exhibited superior properties compared to the conventional separator (Comparative Example 1) containing no tannic acid. In particular, the coating layer in Comparative Example 1 was thicker, but the thermal shrinkage properties thereof were inferior compared to Example 2. In FIG. 7, MD designates the machine direction and TD designates the transverse direction, and MD and TD show the lengths in the machine direction and transverse direction, respectively. The numerals in the upper rows of each table designate MD/TD shrinkage ratio (%) before and after thermal shrinkage.

Examples 3, 4 and 5

Comparison of Separator Properties Depending on Hydroxyl Group in Binder Molecule The separators of Examples 3, 4 and 5 were manufactured in the same manner as in Example 1, with the exception that the inorganic particles comprising alumina and boehmite at a weight ratio of 85:15 were used, and the inorganic material and the binder were mixed at a weight ratio of 75:25. Furthermore, as the binder, a mixture of PVdF-HFP:PVdF-CTFE:hydroxyl-group-containing binder was prepared at a weight ratio of 22:1:2, and the solvent was 100% acetone. As the hydroxyl-group-containing binder, xanthan gum, tannic acid and amylose were used. The polyolefin substrate was PP.

Figure 10:
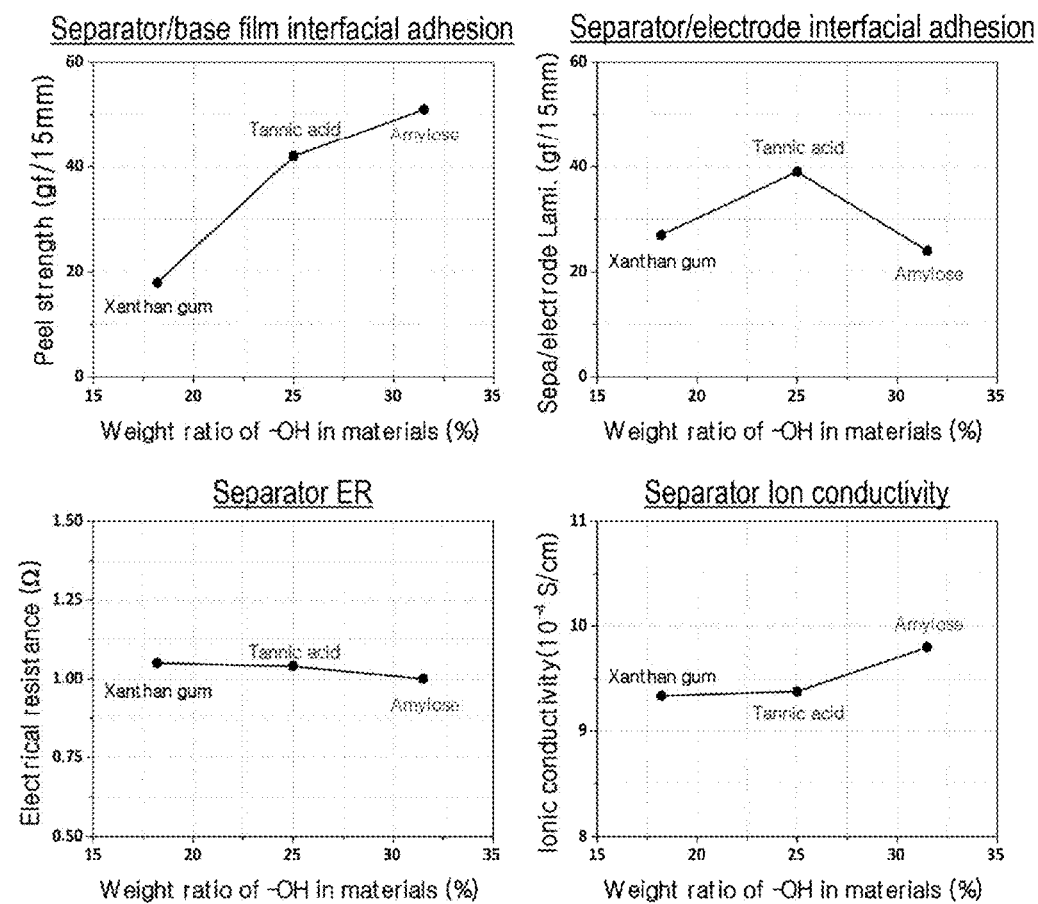
FIG. 10 shows the results of measurement of physical properties of the separator according to an embodiment of the present invention.
Figure 11:
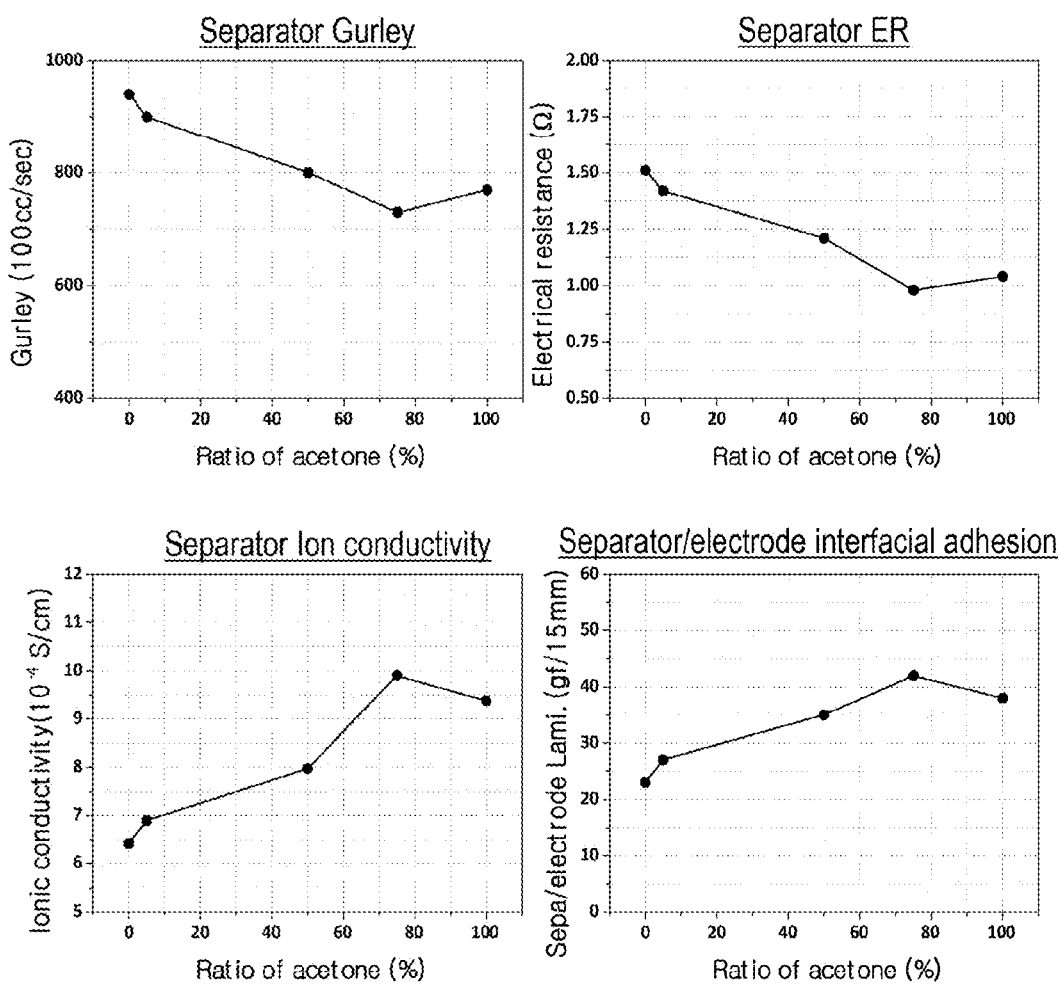
FIG. 11 shows the results of measurement of physical properties of the separator depending on the acetone concentration according to an embodiment of the present invention.

FIG. 10 shows the results of comparison of the properties of the separators of Examples 3, 4 and 5. As used herein, the term, base film, refers to a polyolefin substrate. As the weight proportion of the hydroxyl group in the binder was higher, the adhesion at the interface between the substrate and the inorganic material coating layer was enhanced, and the ion conductivity was also increased. As shown in FIGS. 10 and 11, the separator/base film interfacial adhesion was measured in a manner in which a piece of double-sided tape was attached to glass, the inorganic material coating layer of SRS was attached to the remaining surface of the double-sided tape, and the peel strength of the inorganic material coating layer and the substrate was measured upon the separation of the substrate. The separator/electrode interfacial adhesion was measured in a manner in which a piece of double-sided tape was attached to glass, the electrode was attached to the remaining surface of the double-sided tape, and the peel strength of the electrode and the SRS was measured upon the separation of the substrate. Electrical resistance (ER) and ion conductivity were measured in typical manners, and a separator Gurley value was determined by measuring air permeability. Here, the air permeability was measured using a Gurley-type densometer (No. 158) made by Toyoseiki in accordance with a Gurley method of Japanese Industrial Standard (JIS). Specifically, the air permeability indicates the time (sec) required to pass 100 cc of air through the separator of 1 $inch^2$ under constant air pressure of 4.8 inch.

The properties of the separators of Examples 3, 4 and 5 are shown in Table 1 below.

TABLE 1

| Lot | Xanthan gum | Tannic acid | Amylose |
|---|---|---|---|
| Base film | DB0901 (PP/PE/PP) | | |
| Thickness (μm) | 18.5 | 18.4 | 18.5 |
| Loading (g/m$^2$) | 9.12 | 9.52 | 9.95 |
| Gurley (s/100 cc) | 765 | 770 | 400 |
| Sepa/Electrode Lami. (gf/15 mm) | 28 | 38 | 23 |
| Peel Strength (gf/15 mm) | 19 | 42 | 50 |
| ER (ohm) | 1.05 | 1.04 | 1.00 |
| Ion conductivity (×10$^{-4}$ S/cm) | 9.34 | 9.38 | 9.80 |

Examples 6, 7, 8, 9 and 10

Comparison of Properties Depending on Amount of Acetone in Solvent

The separators of Examples 6, 7, 8, 9 and 10 were manufactured in the same manner as in Example 3, with the exception that tannic acid was used as the hydroxyl-group-containing binder, and the solvent was prepared by mixing water and acetone at weight ratios of 100:0, 95:5, 50:50, 25:75, and 0:100. Changes in the properties depending on the weight ratio of water and acetone are shown in FIG. 11.

Vastly superior effects were exhibited at a 25:75 ratio of water and acetone. Taking into consideration the air permeability, electrical resistance, ion conductivity, and interfacial adhesion, the ratio of water to acetone fell in the range of 50:50 to 0:100. The ratio of water to acetone has an influence on the structure due to the drying of the coating layer, and thus the optimal ratio may vary depending on the amount of the hydroxyl group in the binder. In consideration of the amount of the hydroxyl group according to the present invention, the range of ratio of water to acetone may be expanded to 60:40 to 0:100.

The properties of the separators of Examples 6, 7, 8, 9 and 10 are shown in Table 2 below.

TABLE 2

| Water:Acetone | 100:0 | 95:5 | 50:50 | 25:75 | 0:100 |
|---|---|---|---|---|---|
| Binder | | | Tannic acid | | |
| Base film | | | DB0901 (PP/PE/PP) | | |
| Thickness (μm) | 18.3 | 18.5 | 18.2 | 18.3 | 18.4 |
| Loading (g/m$^2$) | 9.23 | 9.12 | 9.52 | 9.51 | 9.52 |
| Gurley (s/100 cc) | 940 | 900 | 800 | 730 | 770 |
| Sepa/Electrode Lami. (gf/15 mm) | 23 | 27 | 35 | 42 | 38 |
| ER (ohm) | 1.51 | 1.42 | 1.21 | 0.98 | 1.04 |
| Ion conductivity (×10$^{-4}$ S/cm) | 6.42 | 6.90 | 7.97 | 9.90 | 9.38 |

INDUSTRIAL APPLICABILITY

According to the present invention, a separator is configured to include a porous polyolefin substrate and an organic-inorganic hybrid porous coating layer formed on at least one surface of the substrate and configured to include inorganic particles and a binder compound, thus increasing the binder-inorganic material adhesion and the substrate-binder adhesion while preventing internal shorting from occurring by performing self-healing of damage to the separator, enhancing the adhesion of the separator to a cathode and an anode, and withstanding the dissolution of a transition metal of a cathode material.

The invention claimed is:

1. A battery separator, consisting of:
   (a) a polyolefin-based substrate; and
   (b) an active layer consisting of a mixture of a solvent, inorganic particles and a binder, wherein the inorganic particles in the active layer are connected and fixed to each other by the binder, and a porous structure is formed due to an interstitial volume between the inorganic particles,
   wherein the active layer is present as a coating on at least one region selected from the group consisting of (a) a surface of the substrate, and (b) a portion of pores in the substrate,
   wherein the binder contains 10 wt % or more of a hydroxyl group per molecule thereof,
   wherein the solvent comprises water and acetone mixed at a weight ratio of 50:50 to 25:75, and
   wherein the binder is a mixture of
   1) at least one selected from among tannic acid, pyrogallic acid, amylose, amylopectin, and xanthan gum, and
   2) at least one selected from among polyvinylidene fluoride-co-hexafluoropropylene, polyvinylidene fluoride-co-trichloroethylene, polymethylmethacrylate, polyacrylonitrile, polyvinylacetate, polyethylene-co-vinyl acetate, cellulose acetate, cellulose acetate butyrate, cellulose acetate propionate, cyanoethylpullulan, cyanoethylpolyvinylalcohol, cyanoethylcellulose, cyanoethylsucrose, pullulan, an acrylonitrile-styrene-butadiene copolymer, and polyimide.

2. The battery separator of claim 1, wherein the inorganic particles are at least one selected from the group consisting of inorganic particles having a dielectric constant of 5 or more, inorganic particles having piezoelectricity, and inorganic particles having lithium ion transfer capacity.

3. The battery separator of claim 2, wherein the inorganic particles having a dielectric constant of 5 or more are $SrTiO_3$, $SnO_2$, $CeO_2$, MgO, NiO, CaO, ZnO, $ZrO_2$, $Y_2O_3$, $Al_2O_3$, $TiO_2$ or SiC;

the inorganic particles having piezoelectricity are $BaTiO_3$, $Pb(Zr,Ti)O_3$ (PZT), $Pb_{1-x}La_xZr_{1-y}Ti_yO_3$ (PLZT), $Pb(Mg_3Nb_{2/3})O_3$-$PbTiO_3$ (PMN-PT) or hafnia ($HfO_2$); and the inorganic particles having lithium ion transfer capacity are lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), (LiAlTiP)$_xO_y$-based glass (0<x<4, 0<y<13), lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), lithium nitride ($Li_xN_y$, 0<x<4, 0<y<2), $SiS_2$ ($Li_xSi_yS_z$, 0<x<3, 0<y<2, 0<z<4)-based glass or $P_2S_5$ ($Li_xP_yS_z$, 0<x<3, 0<y<3, 0<z<7)-based glass.

4. The battery separator of claim 2, wherein the inorganic particles include at least one selected from among $Al_2O_3$, AlOOH, and $Mg(OH)_2$.

5. The battery separator of claim 1, wherein the polyolefin-based substrate comprises at least one selected from the group consisting of high-density polyethylene, low-density polyethylene, linear low-density polyethylene, ultra-high-molecular-weight polyethylene, and polypropylene.

6. A method of manufacturing the battery separator of claim 1, comprising the steps of:
   1) preparing a binder solution by dissolving a binder in a solvent;
   2) adding and mixing the binder solution obtained in the step 1) with inorganic particles; and
   3) coating at least one region selected from the group consisting of (a) a surface of a polyolefin-based substrate and (a) a portion of pores in the substrate, with a solution obtained in the step 2) and performing drying,
   wherein the binder contains 10 wt % or more of a hydroxyl group per molecule thereof, and
   wherein the solvent comprises water and acetone mixed at a weight ratio of 50:50 to 25:75.

7. A battery separator, manufactured by the method of claim 6.

8. An electrochemical device, comprising the battery separator of claim 1.

9. The electrochemical device of claim 8, wherein the electrochemical device is a lithium secondary battery.

* * * * *